United States Patent
Hall et al.

(10) Patent No.: US 6,774,606 B1
(45) Date of Patent: Aug. 10, 2004

(54) CHARGE CONTROL CIRCUIT AND METHOD FOR CHARGING MULTIPLE BATTERY CELLS

(75) Inventors: John C. Hall, Rancho Palos Verdes, CA (US); Stanley Canter, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/351,114

(22) Filed: Jan. 24, 2003

(51) Int. Cl.[7] ................................................ H02J 7/00
(52) U.S. Cl. ....................................................... 320/116
(58) Field of Search .............................. 320/116, 118, 320/117, 132; 307/66

(56) References Cited

U.S. PATENT DOCUMENTS 6,369,546 B1 * 4/2002 Canter ......................... 320/116

* cited by examiner

Primary Examiner—Pia Tibbits
(74) Attorney, Agent, or Firm—Terje Gudmestad

(57) ABSTRACT

An electrical system has a battery circuit that includes a plurality of battery blocks. Each of the battery blocks has a plurality of parallel strings of battery cells connected thereto. A plurality of virtual cells is formed during charging by parallel coupling one cell from each string in parallel using diode.

17 Claims, 2 Drawing Sheets

Parallel Series Single Battery Bus

CHARGE CONTROL CIRCUIT AND METHOD FOR CHARGING MULTIPLE BATTERY CELLS

TECHNICAL FIELD

The present invention relates generally to power storage systems for satellites, and more particularly to a method and apparatus for charging battery cells and controlling the state of charge of the battery cells during charging.

BACKGROUND ART

Lithium ion batteries are a desirable source for storing power in various types of systems such as satellite systems. For a large storage system a number of battery cells are typically used together to obtain the desired voltage. Maintaining a predetermined state of charge on the batteries is important to maintain the useful life of the battery.

In FIG. 1, a parallel series single battery bus 10 has a plurality of battery cells 12 coupled together in parallel strings 14. As illustrated, each parallel string has eight cells. Each of the strings 14 is coupled in series. A DC-to-DC converter 16 is coupled in series with the plurality of series connected strings 14. Typically, each string would be provided with its own power supply for topping off the charge therein. One problem with such a configuration is that the number of charge balancing circuits required for such a configuration (one for each cell) increases the cost and mass of the system. In satellite systems in particular, reducing cost and mass is an important priority. Another problem with such a configuration is the number of charge balancing circuits make the system intrinsically less reliable. Also, each of the charge balancing circuits must be tied to a common reference voltage which in practice may be difficult to accomplish.

Referring now to FIG. 2, a series parallel battery bus 20. Serial parallel battery bus 20 includes a plurality of series coupled string 22 of cells 24. Each of the series coupled strings 22 has a DC-to-DC converter that couples each of the string 22 to the common bus 28. The series parallel bus 28 requires an eight-fold increase in DC-to-DC converters. However, due to the redundancy requirements of satellite systems, the total mass of eight smaller converters is significantly greater than the mass of the single converter shown in FIG. 1. Another disadvantage of this approach is that each cell must be equipped with a charge balancing circuit. The electrical connection of eight cells in the parallel sees array of FIG. 1 leads to the requirement for twenty-four circuits. In FIG. 2, series parallel topology requires eight times as many circuits. That is, 192 charge balancing circuits are required in the embodiment of FIG. 2.

Another disadvantage of the parallel series array is apparent in that a short circuit condition in an individual cell may lead to the failure of the entire parallel array. On the other hand, the series parallel array intrinsically provides fault isolation. Because lithium ion technology for satellite systems is relatively new, it may be easy to conclude that for reliability considerations, the series parallel system may be more reliable.

It would therefore be desirable to provide an improved charging circuit that reduces the overall mass and cost of the prior art circuit shown in FIGS. 1 and 2.

SUMMARY OF THE INVENTION

The present invention provides a system suitable for multiple cells of a battery system that reduces the overall mass of the system be reducing the number of charge balancing circuits required.

In one aspect of the Invention, a charging circuit has a plurality of parallel strings of series connected battery cells. A plurality of virtual cells are formed In parallel from at least two cells from two different parallel strings. A plurality of charge balancing units are each respectively coupled to one of the plurality of virtual cells. The virtual cell configuration is used when the discharging of the cells is required before recharging to the same state of charge.

In a further aspect of the invention, a method of charging a battery system includes providing a plurality of strings of series connected battery cells, forming a plurality of virtual cells by coupling battery cells in parallel from at least two different strings of the plurality of parallel strings, discharging each of the battery cells in the virtual cells to a predetermined substantially equal state of charge, and charging each of the battery cells.

One advantage of the invention is that the reliability and mass of the overall system is greatly reduced due to the reduced number of charging circuits required. The configuration of the present invention overcomes the major drawbacks of the parallel series in series parallel connections described above in FIGS. 1 and 2.

Other aspects and advantages of the present invention will become apparent upon the following detailed description and appended claims, and upon reference to the accompanying drawings.

BEST MODES FOR CARRYING OUT THE INVENTION

Figure 1:
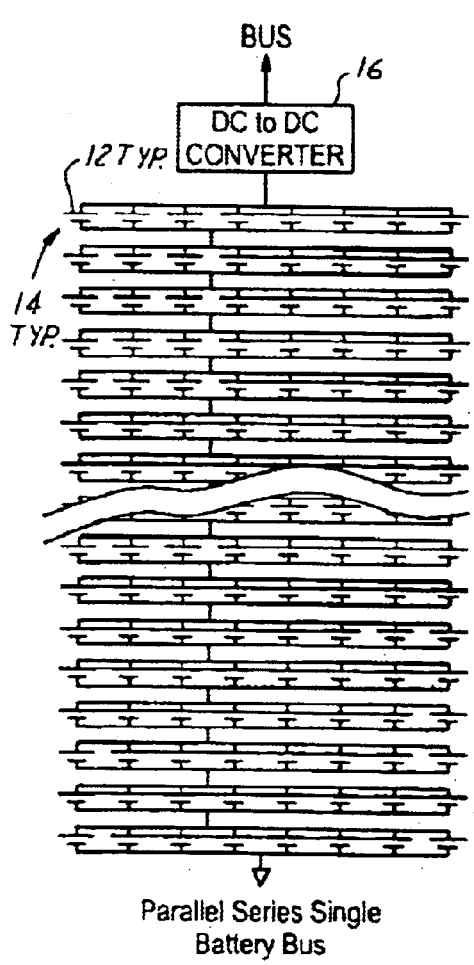
FIG. 1 is a schematic view of a parallel series single battery bus according to the prior art.

In the following figures the same reference numerals will be used to identify the same components.

The present invention is described with respect to a charge control circuit for a satellite. However, the present invention may also be used to charge various types of systems including electric vehicles.

Figure 3:
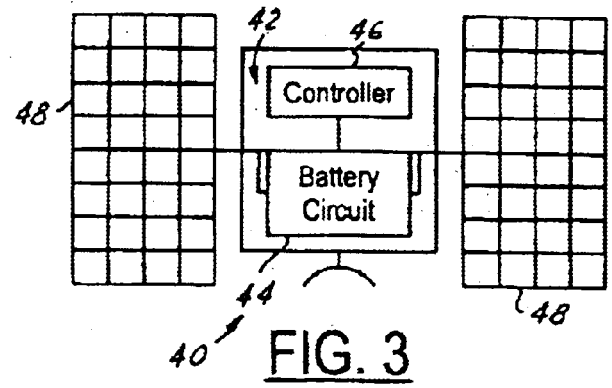
FIG. 3 is a high level block diagrammatic view of a battery circuit formed according to the present invention.

Referring now to FIG. 3, a satellite 40 is illustrated having an electrical system 42 according to the present invention. Electrical system 42 includes a battery circuit 44 and a controller 46 that control the charging and discharging of the battery circuit. The controller 46 is preferably microprocessor-based and may perform various functions other than battery controlling circuits such as other functions in the telemetry command and control of satellite 40. Electrical system 42 may also include solar arrays 48. Solar arrays 48 may provide energy to recharge the battery circuit 44.

Figure 4:
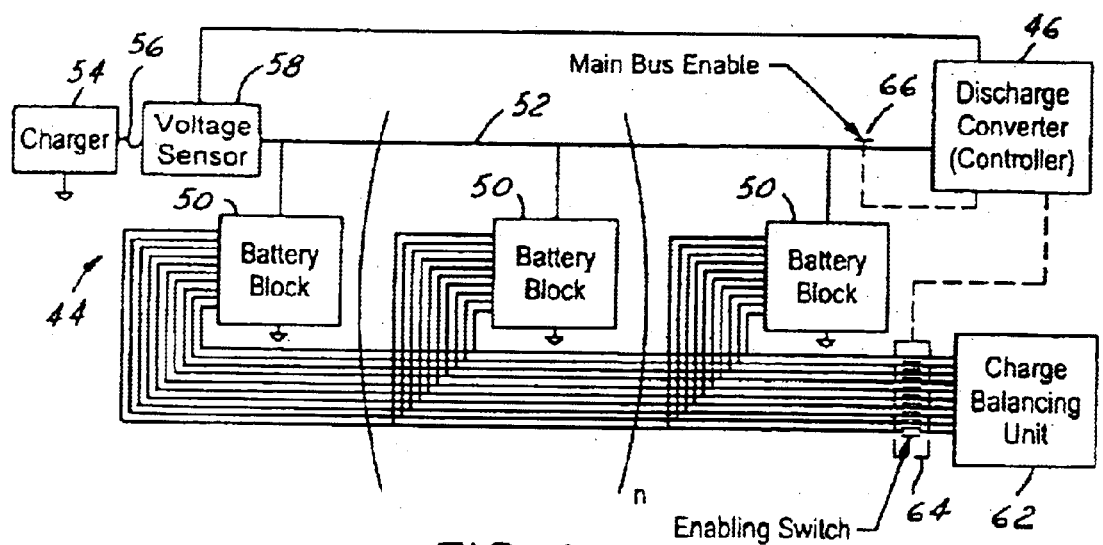
FIG. 4 is a schematic view of a battery circuit according to the present invention.

Referring now to FIG. 4, a portion of battery circuit 44 is illustrated. Battery circuit 44 includes a plurality of battery blocks 50 that are each coupled to a main bus 52. In this example, the controller 46 may be a discharge converter that at minimum controls a portion of the method for charging the cells within each battery block. Each battery block 50 has a plurality of cells as will be further described below In FIG. 5, main bus 52 is also coupled to a charger 54 that is used to charge the cells within battery block according to the method described below. Charger 64 may be coupled to the main bus 52 with a fuse 56. A voltage sensor 58 is also coupled to main bus 52 to help determine the state of charge of each of the battery block 50.

It should be noted that while three battery blocks are illustrated, various numbers of battery blocks may be implemented according to the desired voltage at the main bus 52.

Battery circuit 44 includes a charge balancing unit 62. Charge balancing unit 62 is selectively coupled to each battery block 50 through an enabling switch 64. Charge balancing unit 62 may comprise a plurality of individual units, one for each virtual cell described below in FIG. 5. Charge balancing unit 62 may be a resistive circuit such as a resistor.

A main bus enable switch 66 is used to selectively couple discharge converter controller 46 to the main bus 62. Switch 66 may comprise a relay or the like. If a relay, the device may be solid state or an electro-mechanical solenoid operated device.

Figure 5:
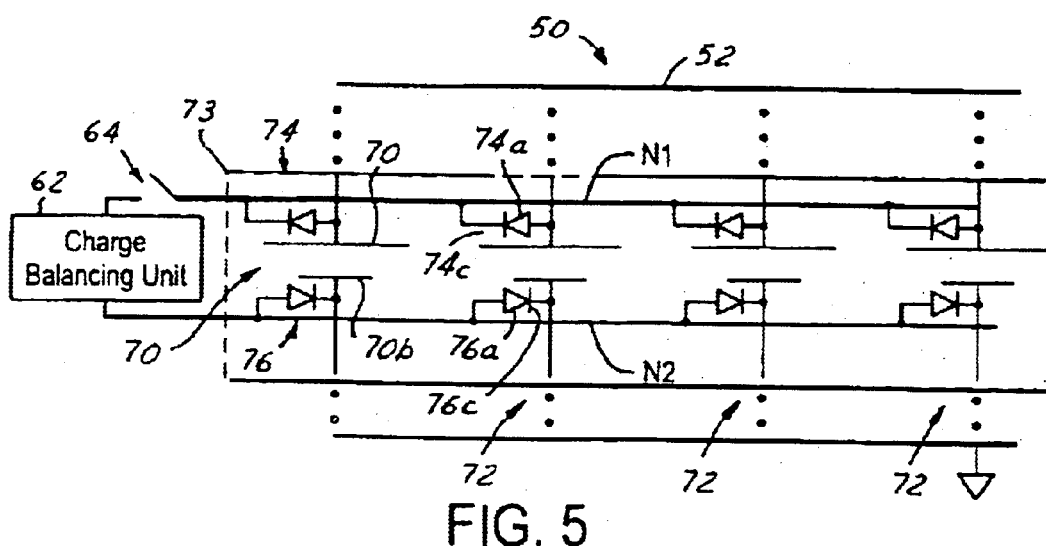
FIG. 5 is a detailed schematic view of a virtual cell charge management topology of FIG. 4.
Figure 2:
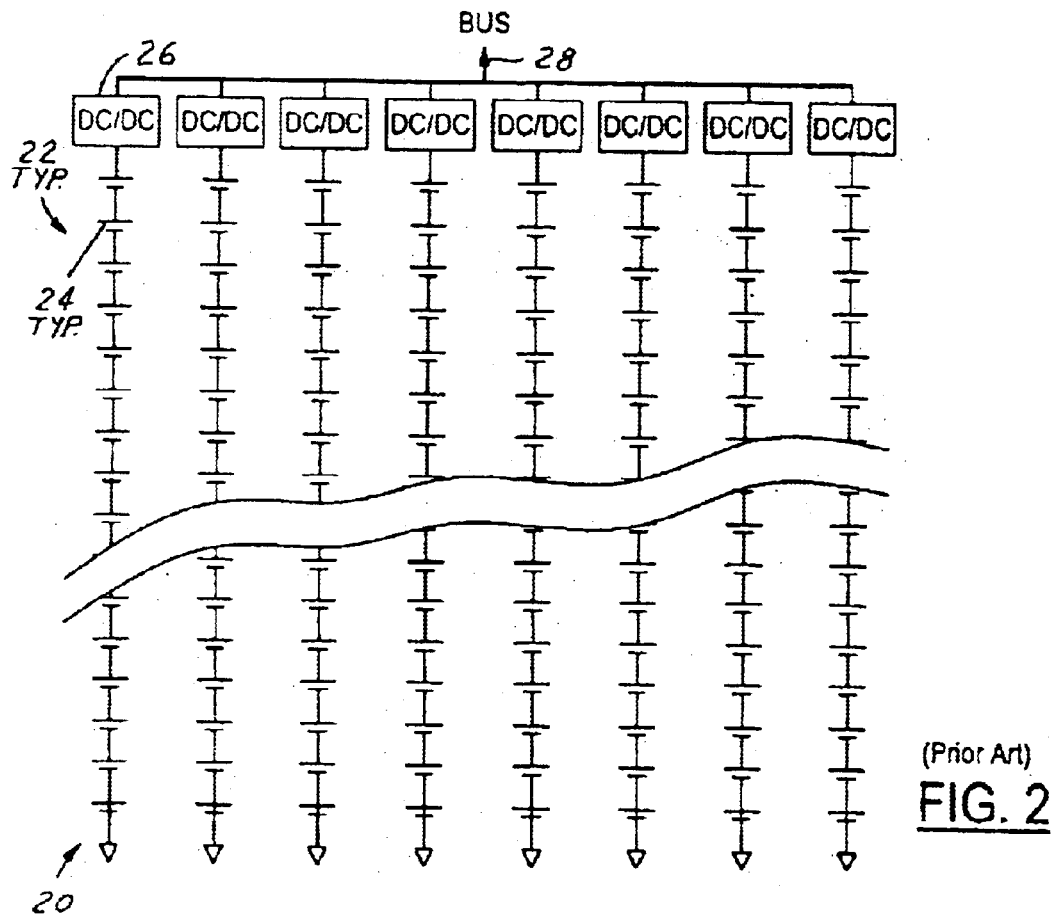
FIG. 2 is a series parallel multiple battery bus formed according to the prior art.

Referring now to FIG. 5, battery block 50 is illustrated in further detail. As described above, each battery block has a plurality of parallel series coupled cells 70. Each cell has a positive terminal 70a and a negative terminal 70b. Thus, the uppermost cell has a positive terminal 70a electrically coupled to main bus 72 and the lowermost cell has a negative terminal 70b coupled to a common ground. The length of the string of cells 70 depends on the particular application. As illustrated, four strings 72 of parallel cells are provided. Thus, two charge balancing circuits per row are contemplated. If an alternative power source is available, all the cells in a virtual cell may be coupled to the same charge balancing circuit.

For charging purposes, each of the cells in a row, i.e., one from each of the strings 72. are connected in parallel. That is, each of the positive terminals 70a is connected to a first node N1. Each negative terminal 70b is connected to a second common node N2. A first diode 74 having an anode 74a and a cathode 74c couple the positive terminal 70a and the common node N1. That is, anode 74a is coupled to positive terminal 70a and cathode 74c is coupled to node N1. A second diode 76 having anode 76a and cathode 76c is used to couple negative terminal 70b to common node N2. That is, cathode 76c is coupled to negative terminal 70b and anode 76a is coupled to node N2. By orienting the diodes 74 and 76 in the illustrated position, current flow to charge balancing unit 62 (to discharge the cells) is controlled. Charge balancing unit 62 is coupled between common node N1 and common node N2 (in parallel with the battery cells). Enabling switch 64 couples and decouples the charge balancing unit 62 from node N1. It should be noted that each of the cells 70, diodes 74 and 76 are electrically coupled in the same manner, i.e., in parallel for charging purposes. The combination of cells 70 in this manner forms a virtual cell 73. The organization of cells in this manner can be thought of as rows of cells one from each column of strings 72.

In operation, battery blocks 50 are disconnected from the main bus through switch 66. Each of the series strings in battery blocks 50 is depleted through charge balancing unit 62 through closed enabling switches 64. One each of the strings is depleted, they are then charged using charger 54 in the offlin condition. The battery blocks 50 are then coupled back to the main bus 52 through switch 68. This sequence would take place for various groupings of battery blocks throughout the system such as a satellite. It should be noted that the charge balancing unit is a floating unit which Is easier to implement. The diodes prevent the interaction between the series connected cells and the virtual cells as formed. One advantage of this is evident when used with lithium is that battery reconditioning is formed by reaching the low voltage limit versus the high voltage limit that is common in other charging schemes.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A battery circuit comprising:
   a plurality of parallel strings of series connected battery cells;
   a plurality of virtual cells formed by coupling battery cells in parallel from at least two different strings of the plurality of parallel strings; and
   a plurality of charge balancing circuits each coupled to a respective one of the plurality of virtual cells.

2. A circuit as recited in claim 1 wherein the plurality of charge balancing circuits comprises a resistive circuit.

3. A circuit as recited in claim 1 further comprising a charger coupled to said plurality of virtual cells.

4. A circuit as recited in claim 1 wherein the plurality of strings at least three strings.

5. A circuit as recited in claim 1 wherein the plurality at battery cells comprise lithium ion cells.

6. A circuit as recited in claim 1 wherein each of the plurality of virtual cells comprise a first common node and a second common node.

7. A circuit as recited in claim 6 wherein each battery cell comprise a positive terminal and a negative terminal, said positive terminal electrically coupled to said first common node and sid negative terminal is electrically coupled to said second common node.

8. A circuit as recited in claim 7 wherein said virtual cell comprising a first diode comprising a first anode and a first cathode, and a second diode comprising a second anode and a second cathode, wherein said first anode is coupled to said positive terminal and said first cathode is coupled to said first common node, wherein said second anode is coupled to said second common node and said second cathode is coupled to said negative terminal.

9. A circuit as recited in claim 1 further comprising a discharge converter coupled to said battery cells.

10. A circuit as recited in claim 9 further comprising a voltage sensor for monitoring the voltage of the cells, said discharge converter controlling said discharging in response to said voltage.

11. A circuit as recited in claim 10 further comprising a switch selectively coupling said discharge converter to said battery cells.

12. A circuit as recited in claim 1 further comprising a switch selectively coupling said charge balancing circuit to said virtual cells.

13. An electrical system comprising:
   a main bus;
   a charger coupled to the main bus; and
   a battery circuit comprising,
   a plurality of parallel strings of series connected battery cells;

a plurality of virtual cells formed by coupling battery cells in parallel from at least two different strings of the plurality of parallel strings; and a plurality of charge balancing circuit each selectively coupled to a respective one of the plurality of virtual cells.

14. A satellite comprising an electrical system formed according to claim 13.

15. A circuit as recited in claim 13 wherein each of the plurality of virtual cells comprise a first common node and a second common node, wherein each battery cell comprises a positive terminal and a negative terminal, said positive terminal electrically coupled to said first common node and said negative terminal is electrically coupled to said second common node.

16. A circuit as recited in claim 15 wherein said virtual cell comprising a first diode comprising a first anode and a first cathode, and a second diode comprising a second anode and a second cathode, wherein said first anode is coupled to said positive terminal and said first cathode is coupled to said first common node, wherein said second anode is coupled to said second common node and said second cathode is coupled to said negative terminal.

17. A circuit as recited in claim 13 further comprising a discharge converter coupled to said battery cells and a voltage sensor for monitoring the voltage of the cells, said discharge converter controlling said discharging in response to said voltage.

* * * * *

UNITED STATES PATENT AND TRADEMARK OFFICE
CERTIFICATE OF CORRECTION

PATENT NO.   : 6,774,606 B1
DATED        : August 10, 2004
INVENTOR(S)  : John C. Hall and Stanley Canter It is certified that error appears in the above-identified patent and that said Letters Patent is hereby corrected as shown below:

Column 3,
Line 4, should read as follows: -- FIG. 5. Main bus 52 is also coupled to a charger 54 that is --
Line 6, should read as follows: -- method described below. Charger 54 may be coupled to the --
Line 9, should read as follows: -- of each of the battery blocks 50. --
Line 22, should read as follows: -- discharge converter controller 46 to the main bus 52. Switch --
Line 67, should read as follows: -- the offline condition. The battery blocks 50 are then coupled --

Column 4,
Line 1, should read as follows: -- back to the main bus 52 through switch 66. This sequence --
Line 31, should read as follows: -- strings comprises at least three strings. --

Column 7,
Line 38, should read as follows: -- comprises a positive terminal and a negative terminal, said --
Line 40, should read as follows: -- node and said negative terminal is electrically coupled to said --

Signed and Sealed this

Seventh Day of December, 2004

JON W. DUDAS
*Director of the United States Patent and Trademark Office*